(12) United States Patent
Barjaktarovic

(10) Patent No.: US 9,846,635 B2
(45) Date of Patent: Dec. 19, 2017

(54) MAKING PRODUCTION DATA AVAILABLE FOR TESTING IN A NON-PRODUCTION ENVIRONMENT

(71) Applicant: salesforce.com, inc., San Francisco, CA (US)

(72) Inventor: Milos Barjaktarovic, Clearwater, FL (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/075,014

(22) Filed: Mar. 18, 2016

(65) Prior Publication Data

US 2017/0270037 A1    Sep. 21, 2017

(51) Int. Cl.
*G06F 9/44* (2006.01)
*G06F 11/36* (2006.01)
*G06F 11/34* (2006.01)

(52) U.S. Cl.
CPC ...... *G06F 11/3688* (2013.01); *G06F 11/3476* (2013.01); *G06F 11/3684* (2013.01)

(58) Field of Classification Search
CPC ............ G06F 11/3688; G06F 11/3684; G06F 3/0484; G06F 8/38; G06F 8/71; G06F 11/3476; G06F 11/3668; G06F 8/20; G06F 8/70
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

OTHER PUBLICATIONS

Rakesh Shukla et al.; A Passive Test Oracle Using a Component's API; 2005 IEEE; 7 pages; <http://ieeexplore.ieee.org/stamp/stamp.jsp?arnumber=1607195>.*

Trong Duc Nguyen et al.; Exploring API Embedding for API Usages and Applications; 2017 ACM; pp. 438-449; <http://dl.acm.org/citation.cfm?id=3097421&CFID=805811069&CFTOKEN=99036296>.*

(Continued)

*Primary Examiner* — Thuy Dao
*Assistant Examiner* — Cuong V Luu
(74) *Attorney, Agent, or Firm* — Haynes Beffel & Wolfeld LLP; Ernest J. Beffel, Jr.; Andrew L. Dunlap

(57) ABSTRACT

The technology disclosed relates to systems and methods usable for developing and testing dashboards with production data in non-production environments including a development server with APIs interposed between a development app and a production server, providing development access to production data before deployment into the production environment. The disclosed development server includes an app server that serves a development app in response to a request from a developer device; and exposes development APIs that mirror production APIs of the production server, and relay of messages between the development APIs and the production APIs. The development server replicates access to production server APIs relied on to retrieve and process time series data from a data store, the replication including access to development server APIs that mirror relative addressing of production APIs. Users can select among reviewed and approved dashboards, and can select to deploy the selected dashboards to the production server.

24 Claims, 11 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,313,564 B2 * | 12/2007 | Melamed ............ G06F 11/3684 |
| | | 707/999.01 |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,001,532 B1 * | 8/2011 | Jakubiak ............ G06F 11/3684 |
| | | 714/46 |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 9,146,841 B2 * | 9/2015 | Pannem ............ G06F 11/3672 |
| 9,274,935 B1 * | 3/2016 | Lachwani ........... G06F 11/3688 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0104575 A1 * | 5/2008 | Fan ..................... G06F 11/36 |
| | | 717/124 |
| 2008/0120602 A1 * | 5/2008 | Comstock ........... G06F 11/3688 |
| | | 717/125 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |

(56) References Cited

U.S. PATENT DOCUMENTS

| | | | |
|---|---|---|---|
| 2009/0320002 A1* | 12/2009 | Peri-Glass | G06F 8/38 717/131 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0210306 A1* | 8/2012 | Tucker | G06F 11/3688 717/126 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0247216 A1 | 9/2013 | Cinarkaya et al. | |
| 2014/0157224 A1* | 6/2014 | Capuozzo | G06F 8/00 717/100 |
| 2014/0359261 A1* | 12/2014 | Collins | G06F 8/60 713/1 |
| 2015/0229533 A1* | 8/2015 | Vida | H04L 67/306 715/736 |

OTHER PUBLICATIONS

Amir Bakhshaie et al.; Brand Valuation for Application Programming Interface Development; 2012 ACM; pp. 129-133; <http://dl.acm.org/citation.cfm?id=2389394&CFID=805811069&CFTOKEN=99036296>.*

Wujie Zheng et al.; Cross-Library API Recommendation using Web Search Engines; 2011 ACM; pp. 480-483; <http://dl.acm.org/citation.cfm?id=2025197&CFID=805811069&CFTOKEN=99036296>.*

Ferdian Thung; API Recommendation System for Software Development; 2016 ACM; pp. 896-899; <http://dl.acm.org/citation.cfm?id=2975940&CFID=805811069&CFTOKEN=99036296>.*

Andre C. Hora ; Using Easy API to develop multimedia applications for maemo platform; 2008 ACM; 8 pages; <http://dl.acm.org/citation.cfm?id=1621095&CFID=805811069&CFTOKEN=99036296>.*

"Graphite 0.10.0 documentation," 2016, <http://graphite.readthedocs.org/en/latest> retrieved Feb. 24, 2010, pp. 1-208.

* cited by examiner

FIG. 2 Example Global Data Center

FIG. 8

FIG. 10 Workflow Example

MAKING PRODUCTION DATA AVAILABLE FOR TESTING IN A NON-PRODUCTION ENVIRONMENT

FIELD OF THE TECHNOLOGY DISCLOSED

A metric & event infrastructure platform serves an intelligent, integrated suite of applications that monitor and provide critical data for systems and applications.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In today's world, we are dealing with huge data volumes, popularly referred to as "Big Data". Web applications that serve and manage millions of Internet users, such as FACEBOOK™, INSTAGRAM™, TWITTER™, banking websites, or even online retail shops, such as AMAZON.COM™ or EBAY™ are faced with the challenge of ingesting high volumes of data as fast as possible so that the end users can be provided with a real-time experience.

Another major contributor to Big Data is a concept and paradigm called "Internet of Things" (IoT). IoT is about a pervasive presence in the environment of a variety of things/objects that through wireless and wired connections are able to interact with each other and cooperate with other things/objects to create new applications/services. These applications/services are in areas likes smart cities (regions), smart car and mobility, smart home and assisted living, smart industries, public safety, energy and environmental protection, agriculture and tourism. Global data centers host thousands of enterprise companies, offering performance and security that enable organizations to serve and manage millions of Internet users of the IoT.

Currently, there is a need to collect and visualize metrics for disparate internet-connected devices. For example, global data centers that process the big data of an IoT ecosystem need to be monitored for reliability by their site reliability engineers. It has become imperative to increase the ability to customize the views needed by different groups of users for monitoring operational status of computing devices and systems. Production support teams for global data centers monitor the infrastructure of global data centers 24 hours a day, seven days a week—monitoring metrics for thousands of hardware systems, including servers and IoT devices. In turn, thousands of visualizations need to be designed and generated to display those metrics, with different teams across an enterprise developing and deploying visualizations.

Production support teams often use a real-time graphing system for monitoring and graphing the performance of computer systems, to monitor metrics and graph system performance. Historically, those who develop new dashboard visualizations have faced the challenges of developing and testing the new dashboard before deploying it in a production development.

When a designer exports a newly developed dashboard to a non-production server for testing, no production data is available in the development environment. That is, the developer is "flying blind" in the sense that they miss the production metrics—they do not know whether the dashboard will function as desired when loaded into production and displaying production data. Also, when a new dashboard is submitted to the production server environment, the new dashboard overwrites the existing dashboard on the server. Errors—often caused by the inability to test the design with production data prior to deployment—can result in down time during which no dashboard is available to production support teams who need to monitor the metrics, so no system covered by the affected dashboard(s) can be monitored.

Therefore, an opportunity arises to provide systems and methods for developing and testing dashboards with production data in non-production environments. Efficient monitoring of global data centers, increased system reliability and uptime percentages, and improved user experience may result.

The disclosed technology relates to making production data available for testing in a non-production environment.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed technology includes a development server with application programming interfaces (APIs) interposed between a development app and a production server, providing development access to production data before deployment into the production environment.

A disclosed development server includes a processor coupled in communication with a persistent development code store that holds development code, the processor coupled in communication with a production server. An app server running on the processor serves a development app that is a modified version of a production app, in response to a request from a developer device; and exposes development APIs that mirror production APIs of the production server, and relay of messages between the development APIs and the production APIs. The development server includes a code manager running on the processor that accesses the development code in the persistent development code store, in response to a request from a development app. The development server also includes a deployment app that includes a user interface for selection among development code definitions of dashboards. The development server additionally replicates access to production server APIs relied on to retrieve and process time series data from a data store, the replication including access to development server APIs that mirror relative addressing of production APIs. Users can select among dashboards defined using JSON, and can select to deploy the selected dashboards to the production server.

A disclosed method of making production data available for development testing includes providing a development server code with app server code that, when run on a processor, serves a development app code that is a modified version of a production app, in response to a request from a developer device; and exposes development APIs that mirror relative addressing of production APIs and relay selected messages between the development app and the production server. The development server code also includes a code manager that accesses the development code in a persistent development code store, in response to a request from the developer app or browser. The method includes receiving at least one data assembly and rendering request from a development server that includes or references a definition of data assembly and rendering requirements; processing each data assembly and rendering request against a data store; and returning results of the processing via the development server.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 8 shows a snippet of a JSON file that represents the dashboard shown in FIG. 7.

DETAILED DESCRIPTION

Introduction

Figure 1:
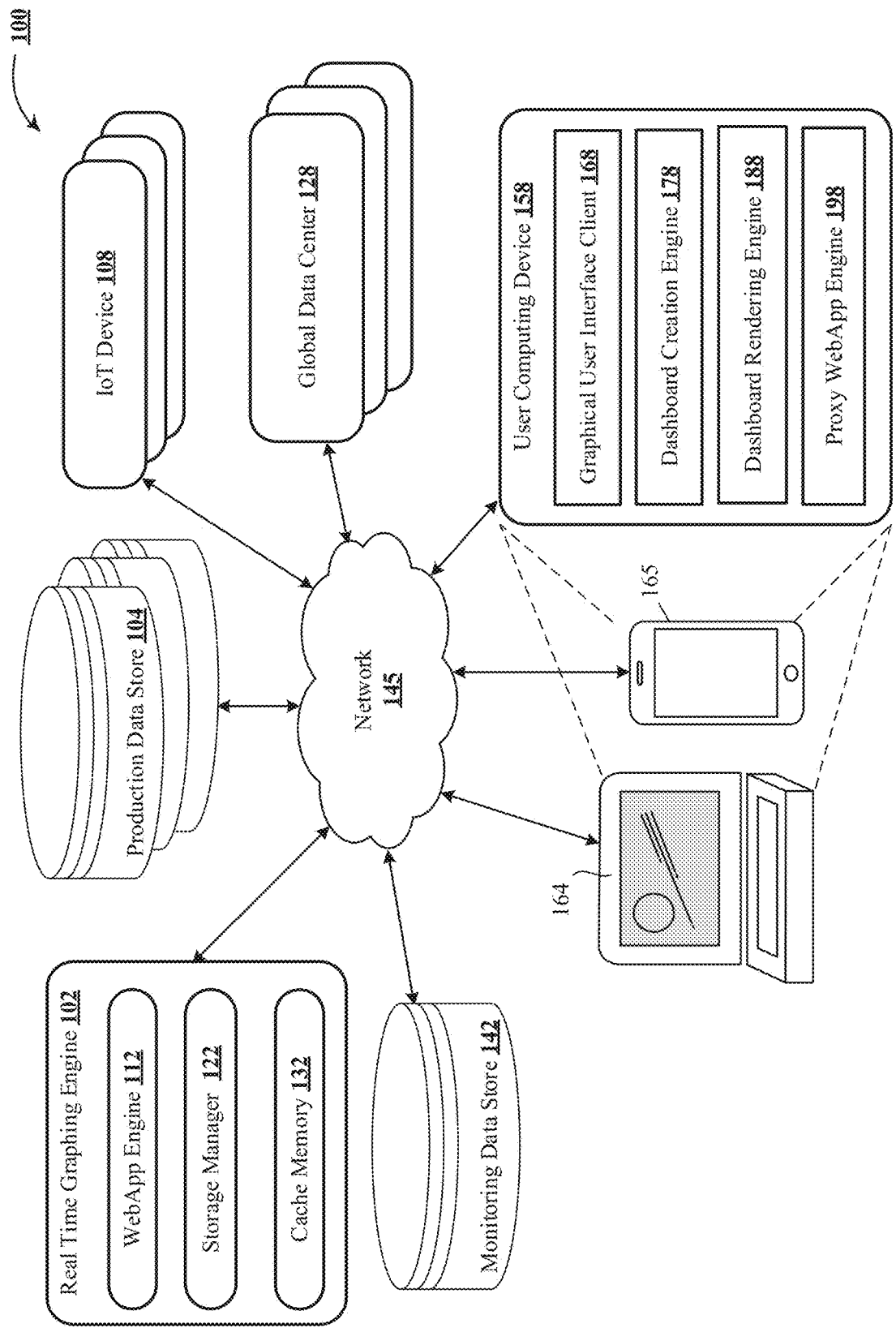
FIG. 1 illustrates an example environment usable for making production data available for testing in a non-production environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Production support teams often use real-time graphing systems for monitoring and graphing the performance of computer systems to monitor metrics and graph system performance. Historically, those who develop new dashboard visualizations have faced the challenges of developing and testing the new dashboards before deploying them in a production development. When a designer exports a newly developed dashboard to a non-production server for testing, no production data is available in the development environment, so the designer and reviewers do not know whether the dashboard will function as desired when loaded into production and displaying production data. Also, when a new dashboard is submitted to a production server environment, the new dashboard often overwrites the existing dashboard on the server. Errors—often caused by the inability to test the design with production data prior to deployment—can cause down time when no dashboard is available to production support teams who need to monitor metrics of production systems.

If, alternatively, new dashboards are uploaded using different dashboard names—to avoid overwriting the existing dashboard—then extra dashboards accumulate and appear in search results, and potentially clog folders and confuse users of the system. After testing, the new dashboards will need to be renamed and reviewed, approved and uploaded again—a process which adds multiple steps at which errors can be introduced. In some use cases, down time is not an acceptable option for dashboard visualizations that display critical metrics. When monitoring dashboards become unavailable, service engineers tasked with maintaining continuous reliable service for enterprise systems are hampered in their ability to complete their goals. Other users across enterprises and the IoT also need dashboards tested with production data before deployment.

A disclosed method of making production data available for development testing includes providing a development server code with app server code that, when run on a processor, serves a development app code that is a modified version of a production app, in response to a request from a developer device; and exposes development APIs that mirror relative addressing of production APIs and relay selected messages between the development app and the production server. The development server code also includes a code manager that accesses the development code in a persistent development code store, in response to a request from the developer app or browser. The method includes receiving at least one data assembly and rendering request from a development server that includes or references a definition of data assembly and rendering requirements; processing each data assembly and rendering request against a data store; and returning results of the processing via the development server.

The disclosed method of making production data available for testing in a non-production environment includes receiving an app request from a developer device at a development server, and serving a development app that is a modified version of a production app. The development app replicates access to a production server access tier which is relied on to retrieve and process time series data from a production server data tier, including relative addressing of production APIs. The development app processes user selected JSON dashboards; and deploys selected, approved JSON dashboards to the production server. The disclosed method also includes receiving at a development API a preview request to preview one or more data assembly, transformation and rendering requests. The requests and a definition of data assembly and rendering requirements are forwarded to the production server at production APIs that mirror the development APIs that received the development preview request. The development app receives, from the production server, and returns, to the client, results from the processing—in the form of one or more graphics or as data usable by the client to render a dashboard of graphs.

Environment for Dashboard Development with Production Data

FIG. 1 illustrates one example implementation for making production data available for testing in a non-production environment 100, which includes real time graphing engine 102, production data store 104, IoT device 108 and global data center 128. Production data store 104 includes monitoring data for production data centers—including, but not limited to performance metrics for servers and other IoT devices. Environment 100 additionally includes monitoring data store 142 and network 145.

Real time graphing engine 102 comprises a production server that includes WebApp engine 112 for rendering graphs, storage manager 122 and cache memory 132. When the user submits a graphing request for a metric, as specified via a dashboard, WebApp engine 112 scans files in monitoring data store 142 identifying data whose time range is specified in the dashboard query, and returns a graph of the data that matches the request. In one implementation, a real time graphing engine can be a Graphite production server.

Storage manager 122 accepts incoming metric data over various protocols from production systems under monitoring, including but not limited to IoT device 108 and global data center 128, and writes the metric values and their related timestamps to disk as efficiently as possible. Metric values are stored in cache memory 132 as they are received, and are flushed to monitoring data store 142 in the form of a time stamp and metric value (e.g. CPU for this server=55 at 13:02:15). Storage manager 122 locates the appropriate file in monitoring data store 142 and appends the received metric data to the file.

Environment 100 also includes user computing device 158—with graphical user interface client 168, dashboard creation engine 178, dashboard rendering engine 188 and proxy WebApp engine 198—running in user device 164 or mobile application 165. Graphical user interface client 168 receives input from users and displays data on the screen of a user's computing device 158. Dashboard creation engine 178 runs on user computing device 158 and renders development code definitions of dashboards on demand. The development code definitions of dashboards can be expressed using JSON, XML or another data format. In one example, a developer can use a browser or developer app to select dashboard creation engine 178, which a developer can use for designing a new dashboard, modifying an existing dashboard and selecting a dashboard to load and test. For some use cases, dashboard templates can be made available for developers.

Proxy WebApp engine 198 includes a development server with a development app which is a modified version of a production app. The development app replicates access to the production real time graphing engine 102 access tier relied on to retrieve and process time series data from the production server data tier, including relative addressing of production APIs. In one implementation, the development app is embedded JavaScript which runs on a dashboard developer's local computer system—user computing device 158.

Dashboard rendering engine 188 implements a rendering of a set of charts received from production real time graphing engine 102—and displays the rendering on the GUI screen of user computing device 158—on laptop or workstation 164 or mobile application 165. For some implementations, data received from production real time graphing engine 102 may be used to render graphics, which can be interactive in some use cases.

A dashboard developer or reviewer can preview a dashboard with production data and, if it represents the desired data well, then they can select the publish dashboard button to load and save the dashboard to real time graphing engine 102—the production server. In one example implementation, the toolbar of the developer app or browser includes a publish dashboard button to implement functionality for deploying tested, approved dashboards from user computing device 158.

Production data store 104 and monitoring data store 142 can be implemented using a general-purpose distributed memory caching system. In some implementations, data structures can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices. Analytical, read-only databases can implement response times of under two seconds when searching over twenty million records and compiling aggregate statistics from selected records.

In some implementations, user computing device 164 can be a personal computer, a laptop computer, tablet computer, smartphone or other mobile computing device, personal digital assistant (PDA), digital image capture devices, and the like. In some implementations, user mobile device 165 can be a tablet computer, smartphone or other mobile computing device, personal digital assistant (PDA), digital image capture devices, and the like.

User computing device 158 can take one of a number of forms, running in a browser or as an application, including user interfaces, dashboard interfaces, engagement consoles, and other interfaces, such as mobile interfaces, tablet interfaces, summary interfaces, or wearable interfaces. In some implementations, it can be hosted on a web-based or cloud-based server in an on premise environment. In one implementation, graphical user interface client 168, dashboard creation engine 178, dashboard rendering engine 188 and proxy WebApp engine 198 can be accessed from a browser running on a computing device. The browser can be CHROME™, INTERNET EXPLORER™, FIREFOX™, SAFARI™, OPERA™, and the like.

Other implementations for dashboard development with production data in a non-production environment 100 may not have the same elements or components as those listed above and/or may have other/different elements or components instead of, or in addition to, those listed above, such as a web server and template database. The different elements or components can be combined into single software modules and multiple software modules can run on the same hardware.

In one implementation, dashboard creation engine 178 includes a feature for displaying one or more graphs at a time, with the set of graphs showing the same time range. A dashboard developer can select a metric series to show on a graph in the dashboard. One example UI for the dashboard creation engine 178 includes a choice between a completer, for selecting a metric series, or a browser tree. The developer can import existing graphs into a dashboard under development, either from saved graphs or from a library of graphs. In some cases, separate graphs that each show a single metric can be combined to show more than one metric on a single graph. The dashboard developer can also order graphs, either by editing the JSON file directly or using the dashboard creation UI.

Dashboard creation engine 178 includes a feature for setting the time range as relative or absolute. Relative times are more commonly used. The current time range can be displayed in the center of the menu bar, as described infra. The developer typically sets dashboards for manual refresh. Alternatively, the dashboard can be set to auto-refresh, which defaults to 60 seconds, for some use cases.

Transforms of metric elements can be customized by combining a group of metric series—using sum, average, product, minimum or maximum functionality. Transformations of data include functions that transform the values in a metric series, against either the y axis or (less commonly) the x-axis. Functions for transformations can include, but are not limited to, scale, scale to seconds, offset, derivative, integral, time-shift, and log. Additionally functions can be used to calculate a new metric series based on an existing metric series, including moving average, percentage, Holt-Winters forecast, ratio and difference of two metrics. Further, filter functions that filter metric series from a group can include highest current value, current value above the limit, most deviant, and remove below percentile. Additionally, line colors, widths and styles and graph titles can be customized, as can graph sizes In one use case, a sequence of events can include a developer selecting the JSON development code definition for a specific dashboard "XYZ" from their browser or local developer app, which calls proxy WebApp engine 198 to request the dashboard via REST API call:/dashboard/load/XYZ. The local server, proxy WebApp engine 198 responds with XYZ JSON from the local file system. Dashboard rendering engine 188 processes the XYZ JSON and finds that it specifies N graphs, and parses the JSON definition.

Dashboard creation engine 178 calls REST API as listed below.

/render/<graph 1 definition>
/render/<graph 2 definition> . . .
/render<graph N definition>

For testing the dashboard, the requests are directed to proxy WebApp engine 198, which then proxies the render API calls, listed below, to production real time graphing engine 102.

/render/<graph 1 definition>
/render/<graph 2 definition> . . .
/render<graph N definition>

Continuing with the example use case, production real time graphing engine 102 responds back with fully rendered PNG images of the rendered graphs to proxy WebApp engine 198, which calls the REST API to send the PNG images of the rendered graph to dashboard creation engine 178 for display via graphical user interface client 168.

The result is a dashboard visualization with graphs described in JSON on the local developer's browser or developer app. The developer can repeat the steps described until they are satisfied with the results, and can then save the dashboard. After review and approval of the look and feel and correctness, the JSON dashboard can be published to production real time graphing engine 102. Proxy WebApp engine 198 would call /dashboard/save/<JSON>.

For some use cases, when the development app connects to the production server, for acquiring production data, proxy WebApp engine 198 requests authentication credentials for a dashboard developer, and stores authentication credentials received from production real time graphing engine 102.

Figure 2:
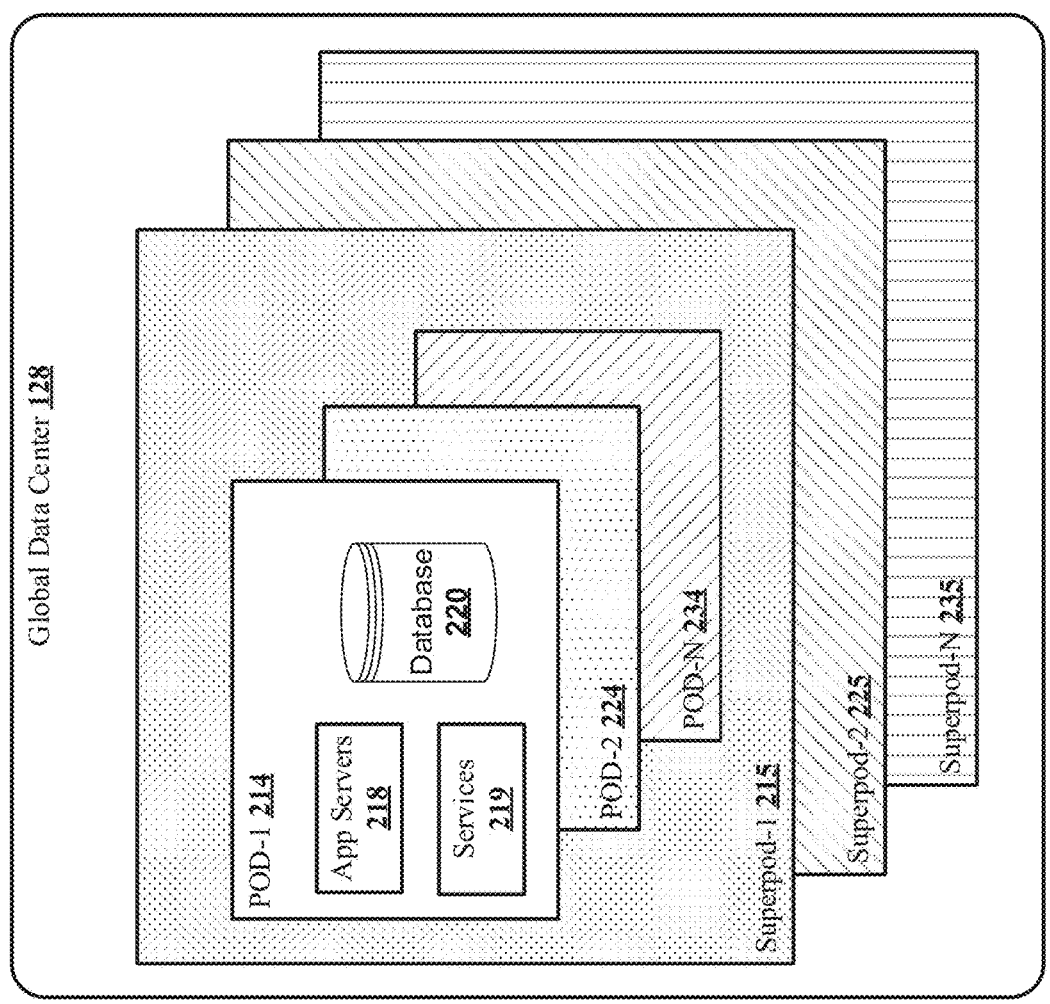
FIG. 2 illustrates a global data center usable in the example environment shown in FIG. 1, according to one implementation of the technology disclosed.

Systems under monitoring, whose metrics need to be displayed on visualization dashboards, can include global data center 128, shown in FIG. 2, which includes super-pods 215, 225 and 235, each of which includes similar components. Super-pod 215 contains POD 214, POD 224 and POD 234, and each POD includes a logical grouping of hosts. In one example, the monitoring of a global data center infrastructure tracks one hundred pods using the disclosed disparate monitoring technology. POD 214 includes app server 218, adjacent services 219 including file system and search services, and database 220. In one implementation, a company allocates a customer to a single POD where their data resides. In common use, multiple customers rely on a single POD—a self-contained unit that contains everything required to run an instantiation of a company's services. Maintenance engineers can monitor many different metrics to ensure system reliability for multiple enterprise customers, using graphs of metric data over time.

Figure 3:
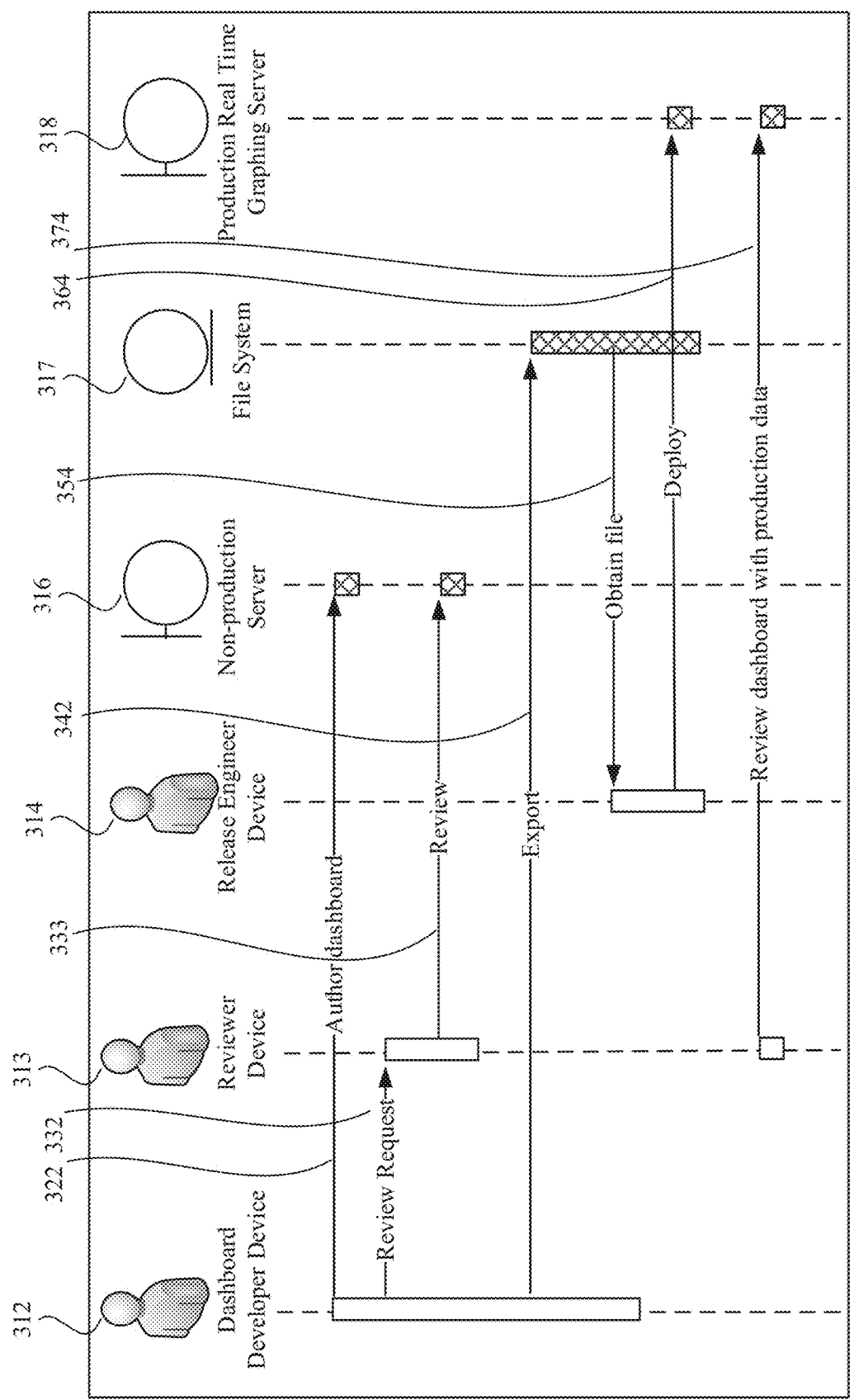
FIG. 3 shows an example for developing dashboards when production data is not available for design testing prior to the release of a dashboard to a production environment.

FIG. 3 shows prior art for developing dashboards before the implementation of the disclosed technology for viewing metrics using real time graphs: a dashboard developer device 312 would transmit a developed dashboard 322 for display on a non-production server 316—with no production data available for testing the dashboard design. The dashboard developer device 312 would transmit a review request 332 to reviewer device 313, for review 333 on nonproduction server 316. After a successful review, dashboard developer device 312 would export the reviewed dashboard to file system 317 and release engineer device 314 would obtain a file displaying test data 354. Release engineer device 314 would deploy 364 the dashboard to production real time graphing server 318, and reviewer device 313 would enable review of the dashboard with production data 374. The deployed dashboard would overwrite the existing dashboard on production real time graphing server 318, so any errors in the newly developed dashboard would cause the service engineers who rely on the graphs of system metrics to assure system reliability would have no access to the needed visualizations of the metrics until the dashboard with errors was corrected, reviewed, exported, deployed and re-reviewed. Instead of viewing the desired graphs, errors can cause display of red Xs in the location on the display where a graph is desired, in one implementation.

Figure 4:
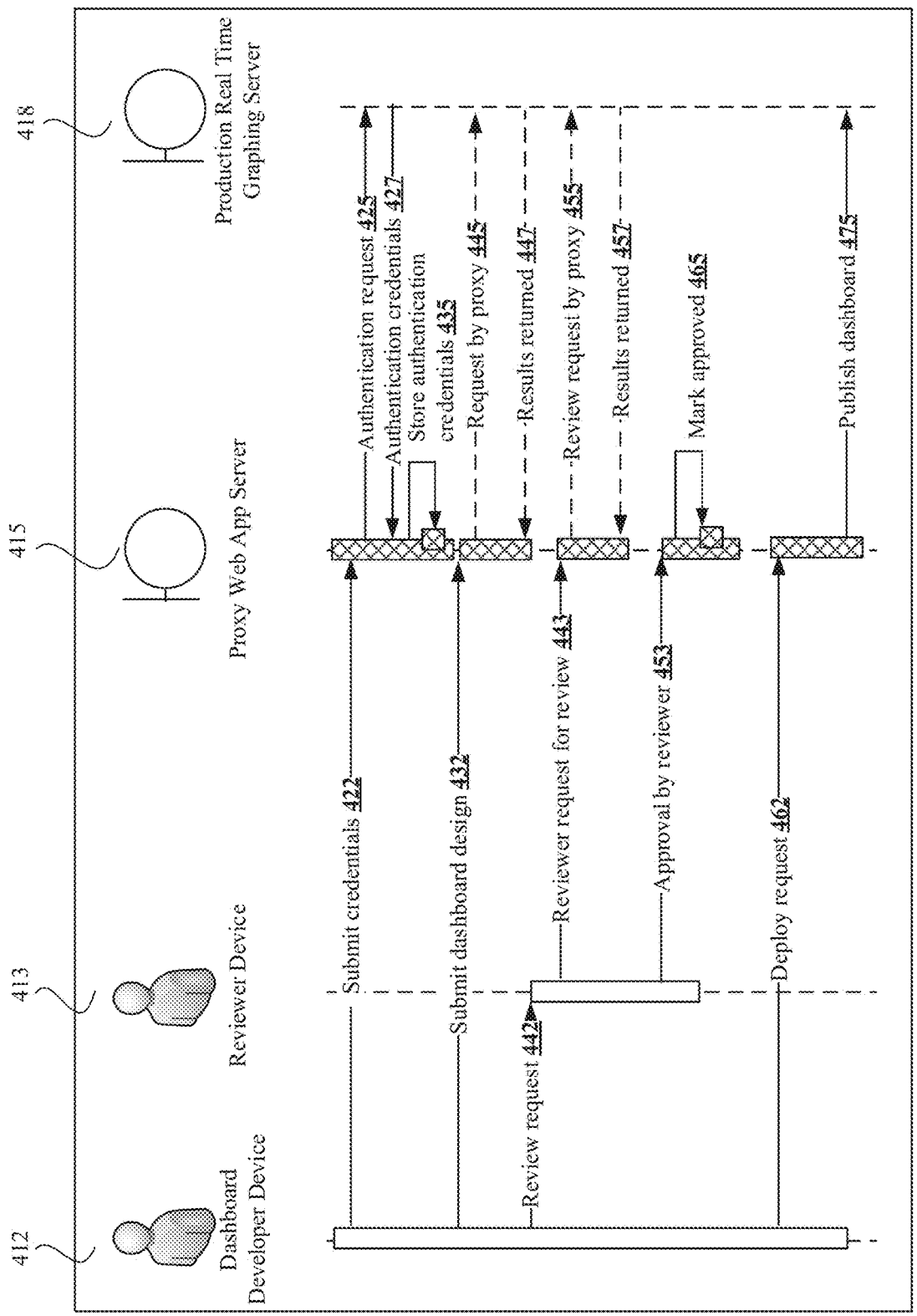
FIG. 4 shows an example implementation of a process for developing dashboards when production data is available for design testing prior to the release to a production environment.

FIG. 4 shows an example of the process for the disclosed method for developing and reviewing dashboards, using proxy web app 425 to access production data from production real time graphing server 418—for use by the proxy web app server 415 in testing a new or changed dashboard design. Dashboard developer device 412 submits credentials 422. Proxy web app server 415 sends an authentication request 425 to production real time graphing server 418 and receives and stores authentication credentials 435 from production real time graphing server 418 for the user of dashboard developer device 412. Dashboard developer device 412 handles submission of a dashboard design 432 to proxy web app server 415, which renders the request by proxy 445 to production real time graphing server 418. Results returned 457 from production real time graphing server 418 include production data for display on the dashboard under review.

Dashboard developer device 412 transmits a dashboard review request 442 to reviewer device 413, which transmits the review request 443 to proxy web app server 415 which sends review request by proxy 455 to production real time graphing server 418. Results returned 457 can be viewed by a reviewer and approved, using proxy web app server 415.

Reviewer device 413 transmits approval by reviewer 453 for the dashboard, and proxy web server 415 marks approved 465 for the new or changed dashboard. Dashboard developer device 412 can be used to transmit deploy request 462 for the approved dashboard, and proxy web app server 415 transmits publish dashboard 475 to production real time graphing server 418.

Figure 5:
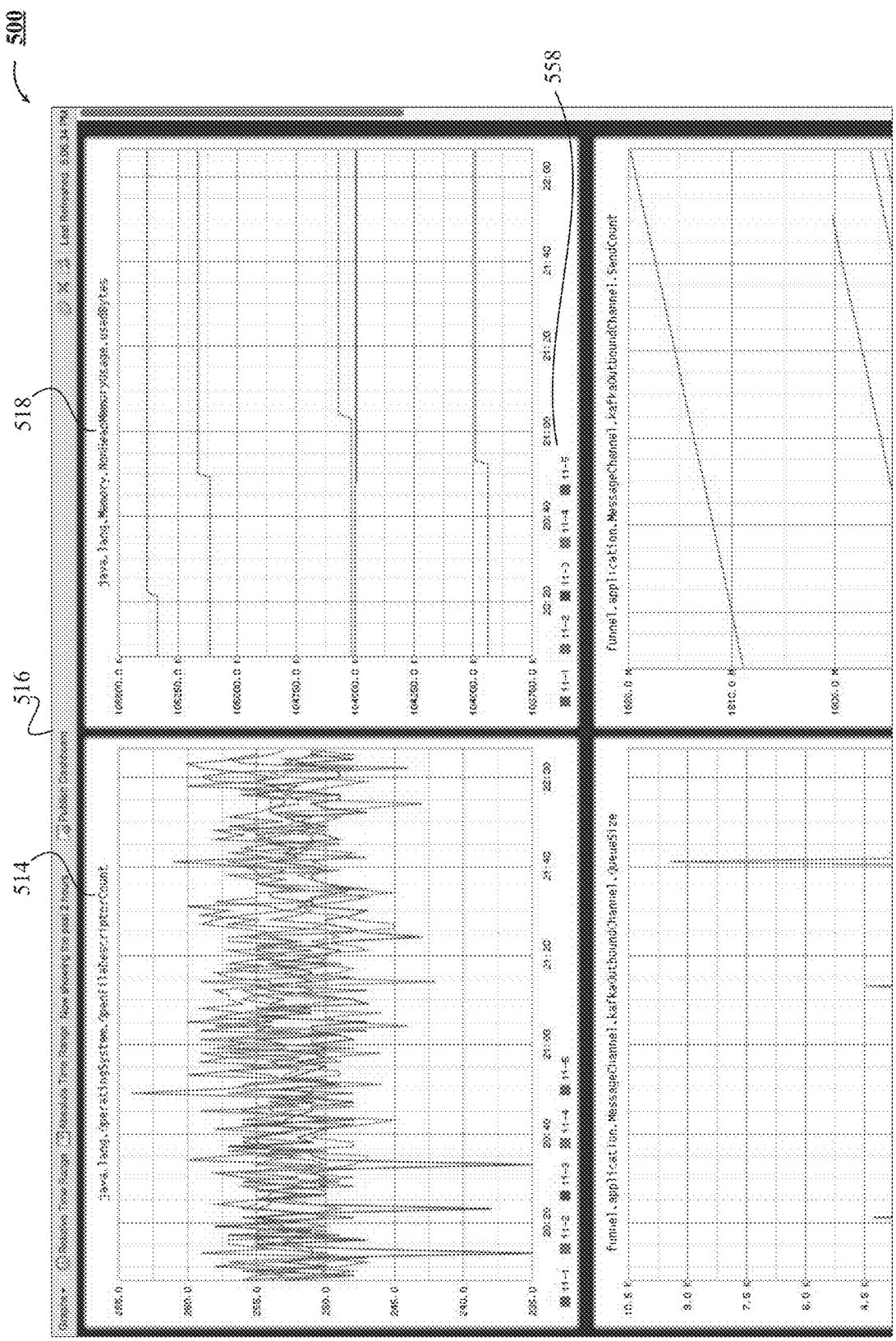
FIG. 5 shows example data infographics displayed in response to a request from a developer device.
Figure 6:
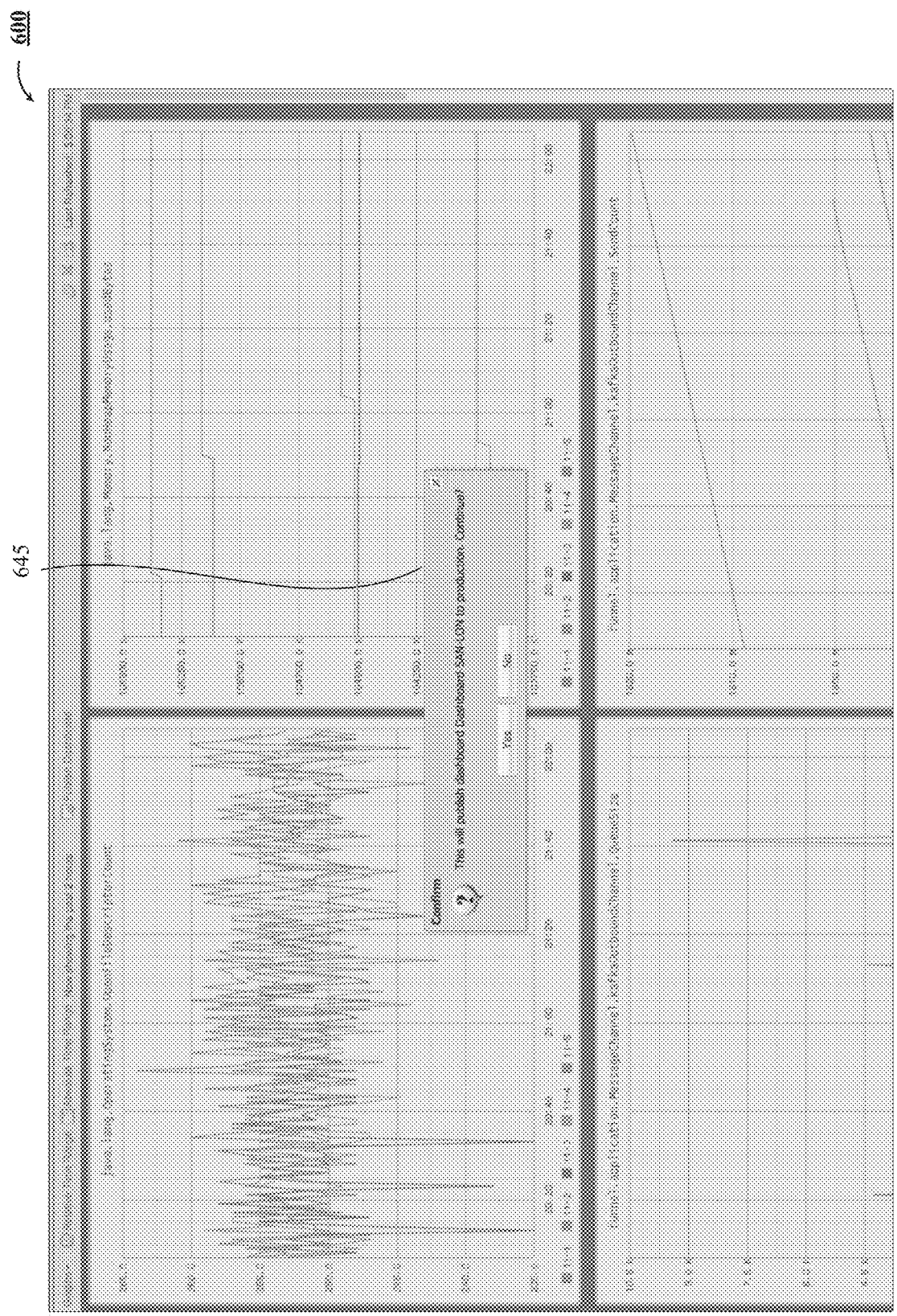
FIG. 6 shows an example publish dialog for deploying selected development code to the production server.
Figure 7:
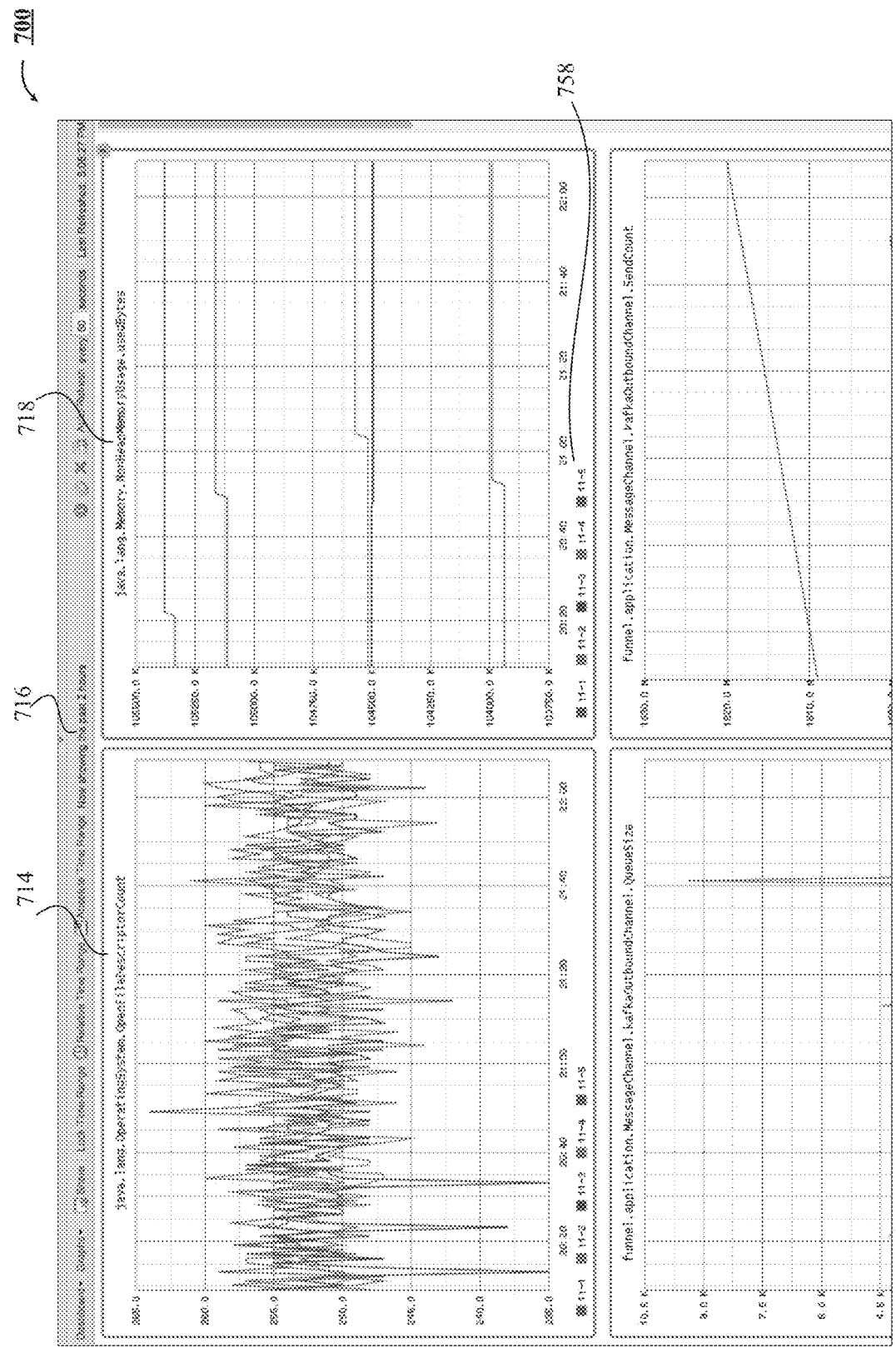
FIG. 7 shows an example published data infographic—a deployed selected development code that represents a dashboard.

FIG. 5 shows an example preview of part of a dashboard 500 with four graphs. The graph in the upper left quadrant shows open file descriptor count 514, with different colors shown for different days. The upper right quadrant shows non heap memory usage 518, with different colors for the display of each of five different days, as shown in the legend 558. The dashboard can be published using publish dashboard 516 after the reviewer approves the design. FIG. 6 shows an example confirmation dialog 645 to confirm that the dashboard will be published. FIG. 7 shows the same dashboard, after it has been published: upper left quadrant shows open file descriptor count 714, with different colors shown for different days and upper right quadrant shows non heap memory usage 718, with different colors for the display of each of five different days, as shown in the legend 758. The time range is specified as showing the past two hours 716. For implementations of the disclosed technology, the reviewer can have a high level of confidence that what they approve is correct, and that the deployed dashboard displayed in the production server is visually the same as the infographic approved by the reviewer, removing the source of many potential errors, and saving development time and energy.

Figure 8:
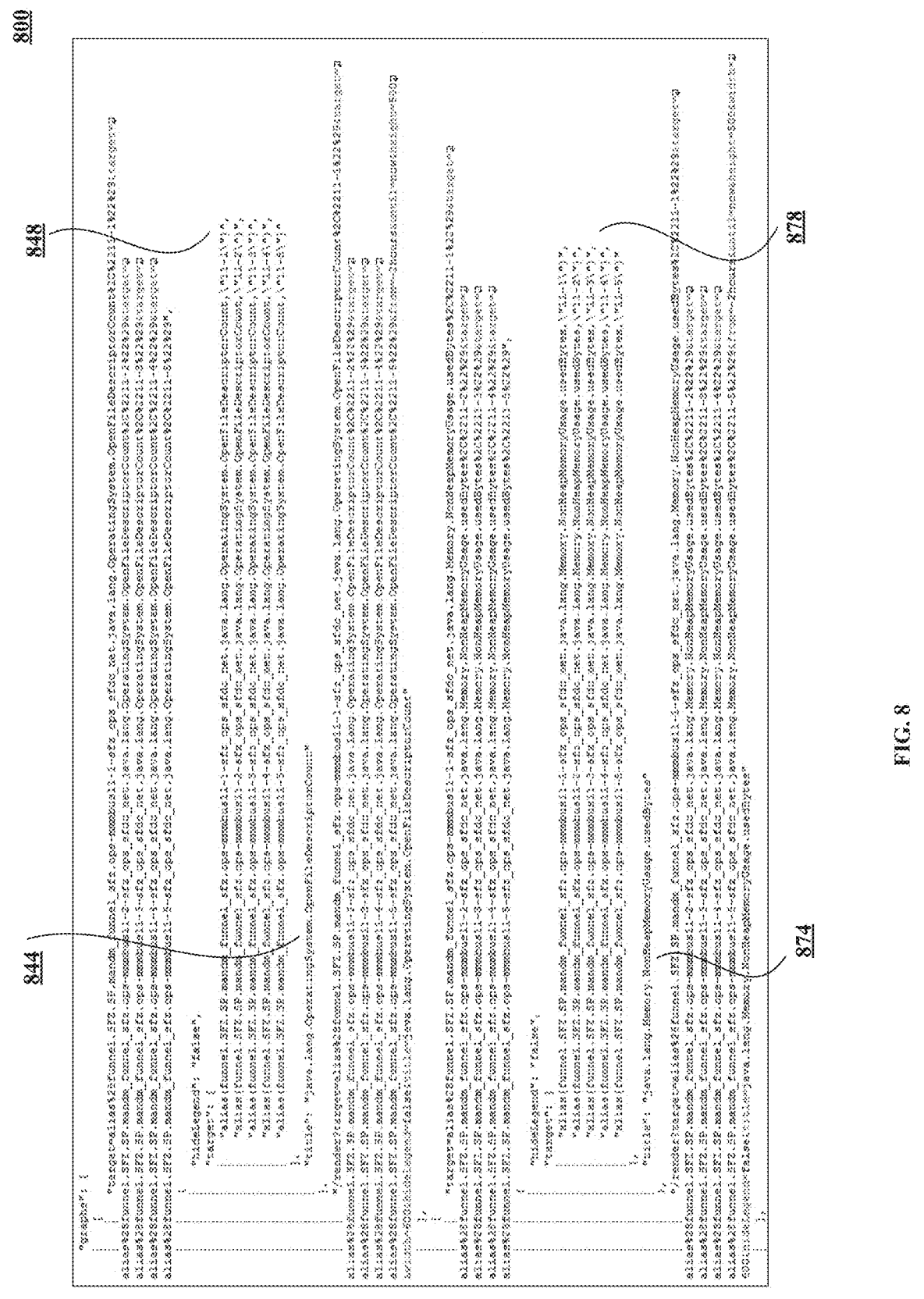

FIG. 8 shows a snippet of the JSON representation for the dashboard infographic, shown in FIG. 5, FIG. 6 and FIG. 7, which includes open file descriptor count 844 for the dates 11-1 through 11-5 848 and non-heap memory usage 874 for the dates 11-1 through 11-5 878.

Figure 9:
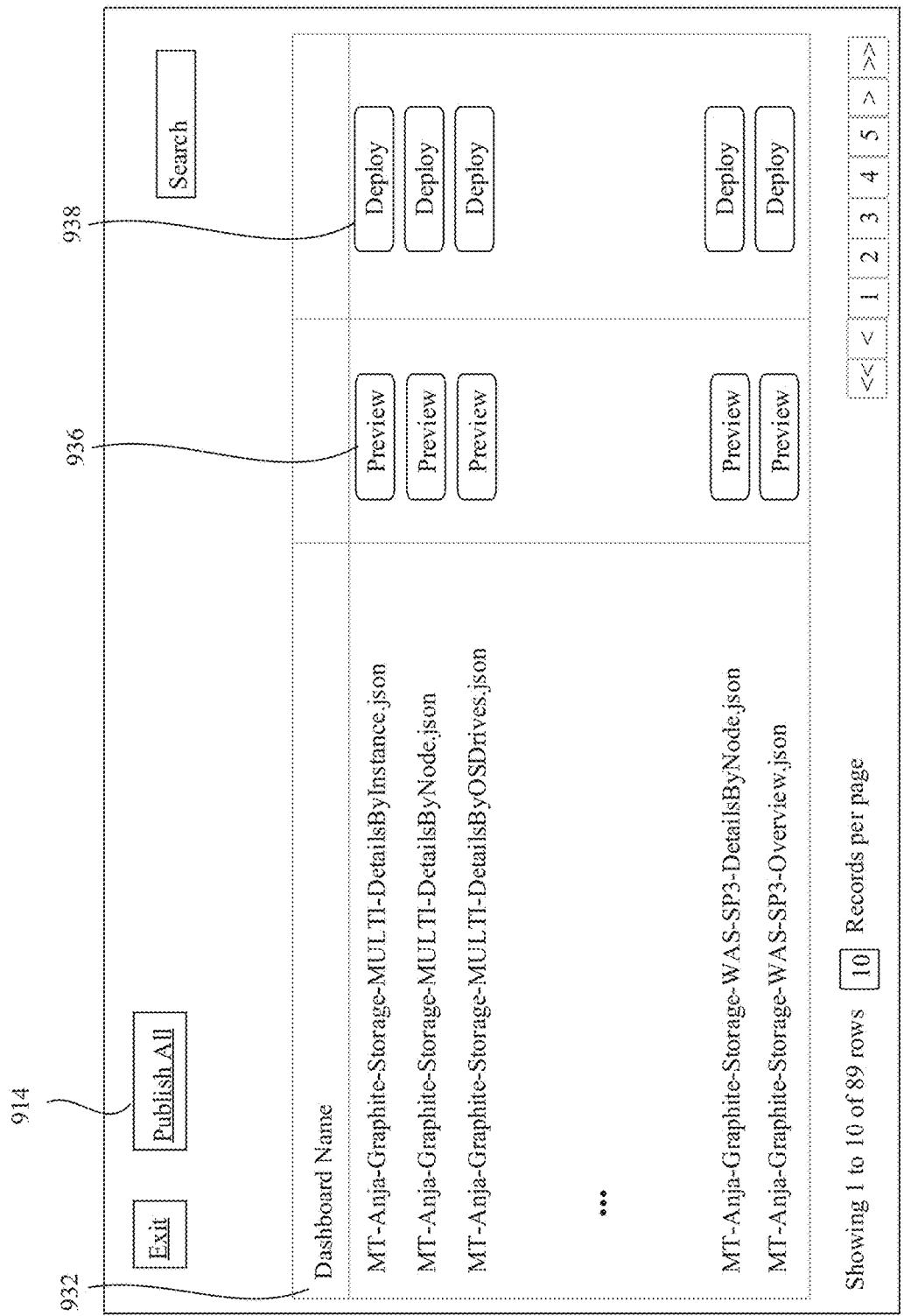
FIG. 9 shows an example user interface for selection of deployment of a development code definition to the production server.

FIG. 9 shows an example dashboard graphical user interface 900 for previewing and deploying dashboards. Users can select a developed dashboard by dashboard name 932 and can choose preview 936 to cause the display of results for the newly developed dashboard. A preview of results can include a specialized background to signify that the user is viewing a local dashboard displaying production data. A user can deploy the dashboard after review and approval of a design—by selecting deploy 938 from the preview screen, which causes the dashboard to be published to production real time graphing server 418 which makes it available to service engineers who select the dashboard on production real time graphing server 418. Additionally a full set of dashboards can be deployed simultaneously, by selecting publish all 914 option. In one implementation, a deployment manager running on the processor deploys selected development code—typically a JSON dashboard—to the production server, in response to a request from the development app.

System Flow

Figure 10:
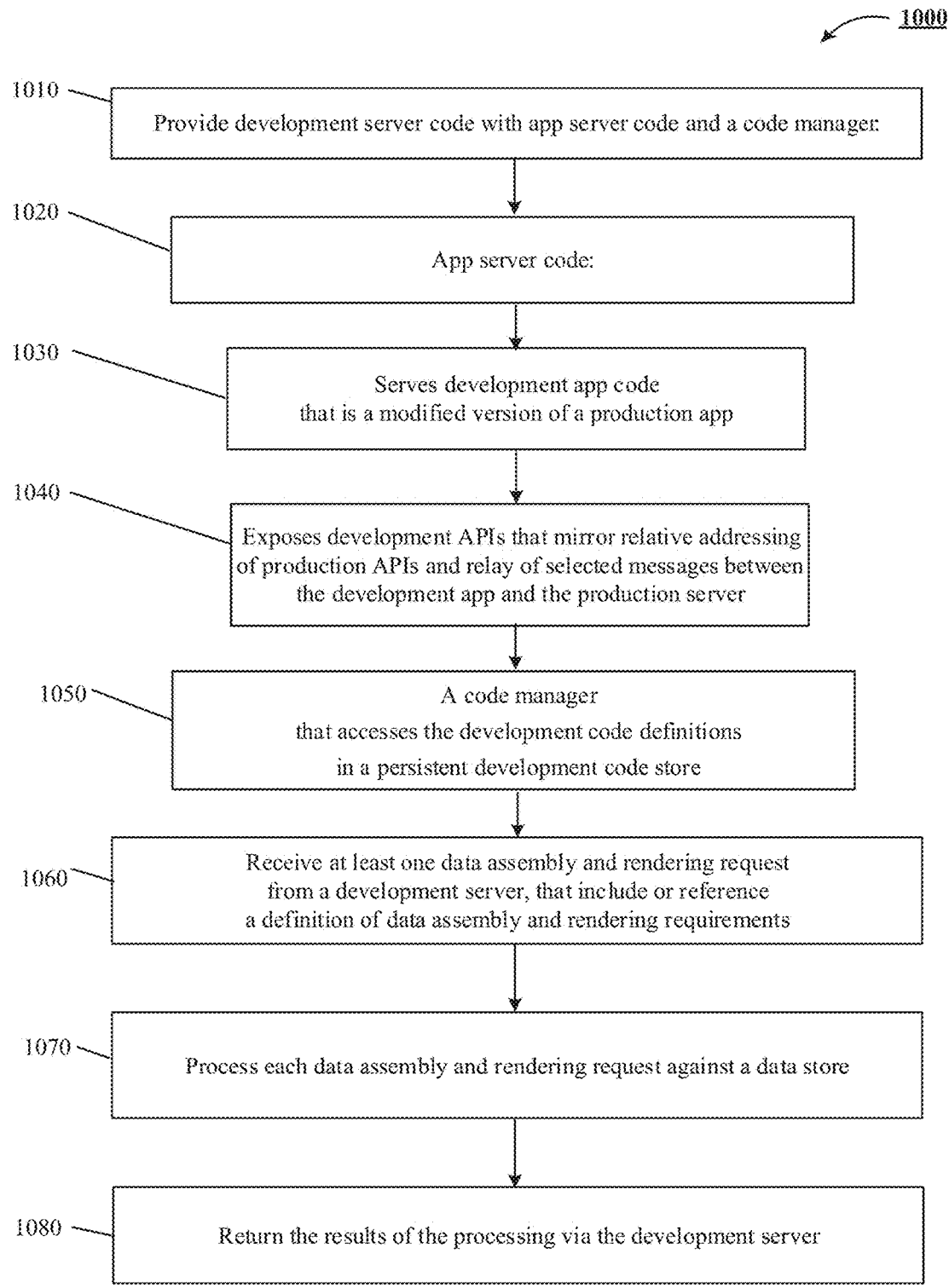
FIG. 10 shows an example workflow for a method of making production data available from a production server for development testing.

FIG. 10 illustrates a flowchart of one implementation 600 of making production data available for testing in a non-production environment. Flowchart 1000 can be implemented at least partially with a database system, e.g., by one or more processors configured to receive or retrieve information, process the information, store results, and transmit the results. Other implementations may perform the steps in different orders and/or with different, fewer or additional steps than the ones illustrated in FIG. 10.

At action 1010, a development server serves an app server code 1020 that is a modified version of a production app 1030, in response to a request from a developer device; and exposes development APIs that mirror relative addressing of production APIs and relay of selected messages between the development app and the production server 1040.

The development server includes a code manager that, when run on the processor, accesses development code definitions in a persistent development code store 1050, in response to a request from the developer app or browser.

At action 1060, the development code server receives at least one data assembly and rendering request from a development server that includes or references a definition of data assembly and rendering requirements.

At action 1070, development server code processes each data assembly and rendering request against a data store. At action 1080, development server code returns results of the processing via the development server.

The actions described above can be subdivided into more steps or combined into fewer steps to carry out the method described using a different number or arrangement of steps.

Multi-Tenant Integration

Figure 11:
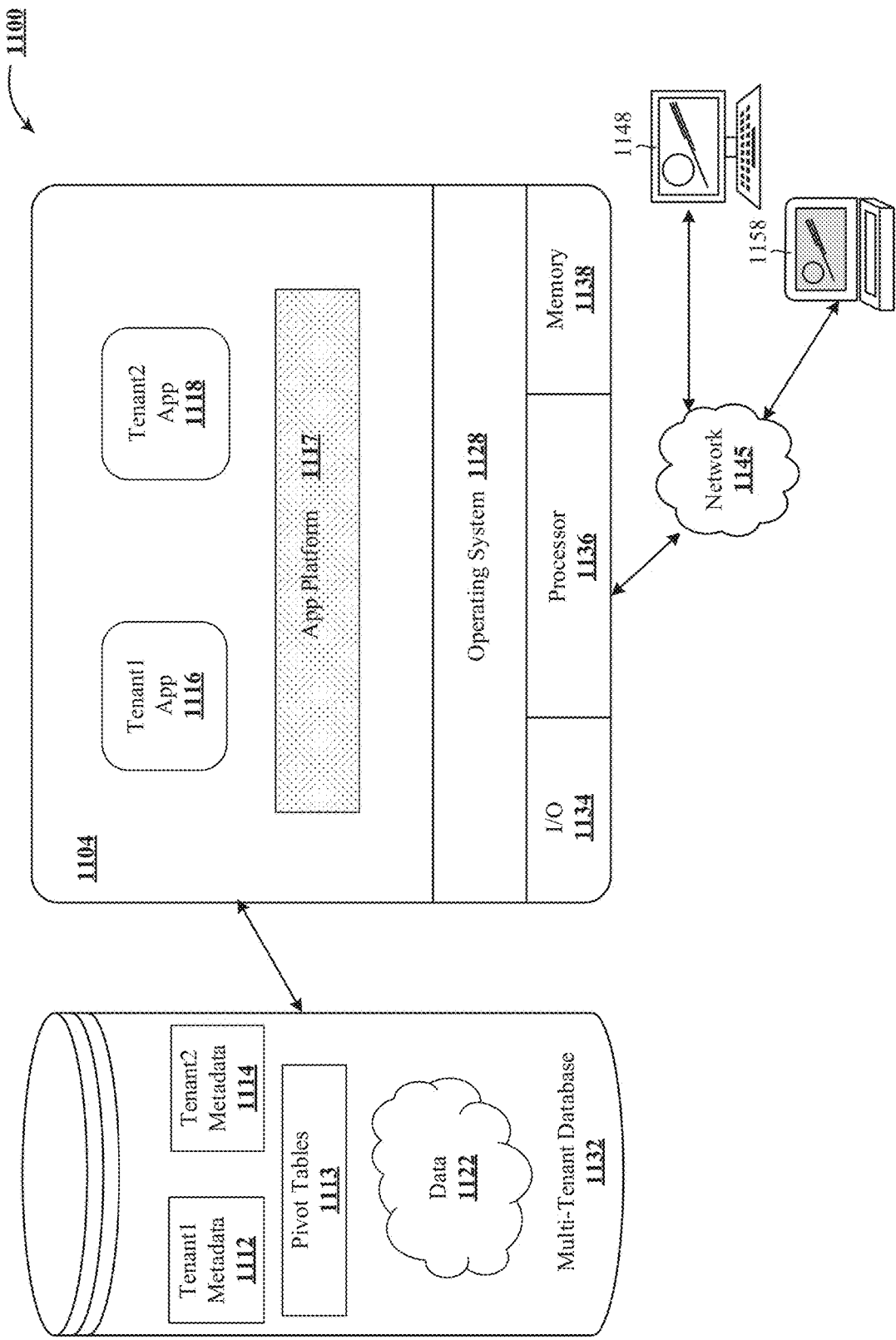
FIG. 11 is a block diagram of an exemplary multi-tenant system suitable for integration with the environment of FIG. 1 in accordance with one or more implementations of the technology disclosed.

FIG. 11 presents a block diagram of an exemplary multi-tenant system 1100 suitable for making production data available for testing in a non-production environment 100 of FIG. 1. In general, the illustrated multi-tenant system 1100 of FIG. 11 includes a server 1104 that dynamically supports virtual applications 1116 and 1118, based upon data 1122 from a common database 1132 that is shared between multiple tenants, alternatively referred to herein as a "multi-tenant database". Data and services generated by the virtual applications 1116 and 1118, including GUI clients, are provided via a network 1145 to any number of client devices 1148 or 1158, as desired.

As used herein, a "tenant" or an "organization" refers to a group of one or more users that shares access to common subset of the data within the multi-tenant database 1132. In this regard, each tenant includes one or more users associated with, assigned to, or otherwise belonging to that respective tenant. Stated another way, each respective user within the multi-tenant system 1100 is associated with, assigned to, or otherwise belongs to a particular tenant of the plurality of tenants supported by the multi-tenant system 1100. Tenants may represent users, user departments, work or legal organizations, and/or any other entities that maintain data for particular sets of users within the multi-tenant system 1100. Although multiple tenants may share access to the server 1104 and the database 1132, the particular data and services provided from the server 1104 to each tenant can be securely isolated from those provided to other tenants. The multi-tenant architecture therefore allows different sets of users to share functionality and hardware resources without necessarily sharing any of the data 1122 belonging to or otherwise associated with other tenants.

The multi-tenant database 1132 is any sort of repository or other data storage system capable of storing and managing the data 1122 associated with any number of tenants. The database 1132 may be implemented using any type of conventional database server hardware. In various implementations, the database 1132 shares processing hardware with the server 1104. In other implementations, the database 1132 is implemented using separate physical and/or virtual database server hardware that communicates with the server 1104 to perform the various functions described herein. The multi-tenant database 1132 may alternatively be referred to herein as an on-demand database, in that the multi-tenant database 1132 provides (or is available to provide) data at run-time to on-demand virtual applications 1116 or 1118 generated by the application platform 11111, with tenant1 metadata 1112 and tenant2 metadata 1114 securely isolated.

In practice, the data 1122 may be organized and formatted in any manner to support the application platform 1122. In various implementations, conventional data relationships are established using any number of pivot tables 1113 that establish indexing, uniqueness, relationships between entities, and/or other aspects of conventional database organization as desired.

The server 1104 is implemented using one or more actual and/or virtual computing systems that collectively provide the dynamic application platform 1117 for generating the virtual applications. For example, the server 1104 may be implemented using a cluster of actual and/or virtual servers operating in conjunction with each other, typically in association with conventional network communications, cluster management, load balancing and other features as appropriate. The server 1104 operates with any sort of conventional processing hardware such as a processor 1136, memory 1138, input/output features 1134 and the like. The input/output 1134 generally represent the interface(s) to networks (e.g., to the network 1145, or any other local area, wide area or other network), mass storage, display devices, data entry devices and/or the like. User interface input devices 1134 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 1117.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 1136 to the user or to another machine or computer system.

The processor 1136 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1138 represents any non-transitory short or long term storage or other computer-readable media capable of storing programming instructions for execution on the processor 1136, including any sort of random access memory (RAM), read only memory (ROM), flash memory, magnetic or optical mass storage, and/or the like. The computer-executable programming instructions, when read and executed by the server 1104 and/or processor 1136, cause the server 1104 and/or processor 1136 to create, generate, or otherwise facilitate the application platform 1117 and/or virtual applications 1116 and 1118, and perform one or more additional tasks, operations, functions, and/or processes described herein. It should be noted that the memory 1138 represents one suitable implementation of such computer-readable media, and alternatively or additionally, the server 1104 could receive and cooperate with external computer-readable media that is realized as a portable or mobile component or application platform, e.g., a portable hard drive, a USB flash drive, an optical disc, or the like.

The application platform 1117 is any sort of software application or other data processing engine that generates the virtual applications 1116 and 1118 that provide data and/or services to the client devices 1148 and 1158. In a typical implementation, the application platform 1117 gains access to processing resources, communications interfaces and other features of the processing hardware using any sort of conventional or proprietary operating system 1128. The virtual applications 1116 and 1118 are typically generated at run-time in response to input received from the client devices 1148 and 1158.

With continued reference to FIG. 11, the data and services provided by the server 1104 can be retrieved using any sort of personal computer, mobile telephone, tablet or other network-enabled client device 1148 or 1158 on the network 1145. In an exemplary implementation, the client device 1148 or 1158 includes a display device, such as a monitor, screen, or another conventional electronic display capable of graphically presenting data and/or information retrieved from the multi-tenant database 1132.

In some implementations, network(s) 1145 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

Some particular implementations and features are described in the following discussion.

In one implementation, a disclosed development server includes a processor, memory coupled to the processor, the processor coupled in communication with a persistent development code store that holds development code, and with the processor coupled in communication with a production server. An app server running on the processor serves a development app that is a modified version of a production app, in response to a request from a developer device; exposes development APIs that mirror production APIs of the production server, and relays messages between the development APIs and the production APIs. The disclosed development server also includes a code manager running on the processor that accesses the development code in the persistent development code store, in response to a request from the development app; and the development app including a user interface for selection among development code definitions of dashboards; and replication of access to production server APIs used to retrieve and process time series data from a data store, the replication including access to development server APIs that mirror relative addressing of production APIs.

The disclosed development server can also include the app server, running on the processor, establishing a session by authenticating the developer to the production server. The disclosed development server further includes a deployment manager running on the processor that deploys selected development code to the production server, in response to a request from the development app. The development server can further include a user interface for selection of deployment of a development code definition to the production server. For the disclosed development server, development code definitions of dashboards are expressed in JSON or XML. Additional formats that transmit data objects consisting of attribute-value pairs can be used to express development code definitions of dashboards.

In one implementation, a disclosed method of making production data available from a production server for development testing includes providing a development server code, including an app server code that, when run on a processor, serves a development app code that is a modified version of a production app, in response to a request from a developer device; and exposes development APIs that mirror relative addressing of production APIs, and relay of selected messages between the development app and the production server. The disclosed method also includes a code manager that, when run on the processor, accesses development code definitions in a persistent development code store, in response to a request from the development app. The disclosed method further includes receiving at least one data assembly and rendering request from a development server that includes or references a definition of data assembly and rendering requirements; processing each data assembly and rendering request against a data store; and returning results of the processing via the development server.

The disclosed method further includes a deployment manager that when run on the processor that accesses the development code in the persistent development code store, deploys selected development code to the production server, in response to a request from the development app. The method disclosed can further include the production server receiving from the development server code, one or more data transformation requests that include a definition of data transformation requirements.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

For the disclosed method, the development code in the persistent development code store uses one of JSON or XML to express development code definitions of dashboards. Additional formats that transmit data objects consisting of attribute-value pairs can be used to express development code definitions of dashboards.

In some implementations of the disclosed method, the results returned via the development server from the processing include a graphic that illustrates the data assembled in response to the data assembly and rendering request. In other implementations, the results returned via the development server from the processing include data values assembled in response to the data assembly and rendering request, adapted for rendering by the development app.

In other implementations, a disclosed method of making production data available for development testing includes, at a development server, receiving an app request from a developer device and serving a development app that is a modified version of a production app. The development app processes user selection among development code definitions of dashboards in a persistent development code store; and replicates access to a production server, including development APIs replicating relative addressing of production APIs that implement access to data assembly from a production data store. The method also includes receiving, at a development API, a preview request from the development app to preview at least one data assembly and rendering request; and forwarding the request and a dashboard code definition to the production server at a production API replicated by the development API that received the preview request. The method further includes receiving from the production server and causing display, at the developer device, of results from the processing.

In some implementations of the disclosed method, the results received from the production server include a graphic that illustrates the data assembled in response to the preview request. For other implementations, the results received from the production server include data values assembled in response to the preview request, adapted for rendering at the developer device. The developer device can include an app or a browser.

For some implementations, the development API includes a user interface for selection of deployment to the production server of the development code definitions. The persistent development code store uses one of JSON or XML to represent development code definitions of dashboards.

In one implementation, a development server code, loaded onto a tangible computer readable medium, includes instructions executable on a processor that implement an app server that serves a development app code that is a modified version of a production app from a production server, in response to a request from a developer device, exposes development APIs that mirror relative addressing of production APIs that implement access to data assembly from a production data store; relays selected messages between the development app and the production server; and returns results from the processing to a developer device. The production APIs process requests for data assembly and rendering, accompanied by dashboard code definitions; and a code manager accesses the development code in a persistent development code store, in response to a request from the development app. The disclosed implementation of the development server code further includes a deployment manager that deploys selected development code to the production server, in response to a request from the development app, and can include a user interface for selection of deployment to the production server of a selected development code definition.

In some implementations of the disclosed development server code, the results returned via the development server from the processing include a graphic that illustrates the data assembled in response to the data assembly and rendering request. In other implementations, the results returned via the development server from the processing include data values assembled in response to the data assembly and rendering request, adapted for rendering by the development app.

In yet other implementations a development app code, loaded onto a tangible computer readable medium, includes instructions executable on a processor that implement a development app that is a modified version of a production app from a production server, that includes reference to development APIs of a development server that mirror relative addressing of production APIs that implement access to data assembly from a production data store and cause relay of messages between the development app and the production server. The production APIs process requests for data assembly and rendering, accompanied by dashboard code definitions, against a production data store; access to a code manager running on the development server that accesses the development code in persistent development code store, in response to a request from the development app. Further, the development app includes access to a deployment manager that deploys selected development code from the persistent development code store to the production server, in response to a request from the development app. For the disclosed development app code, the deployment manager can include a user interface for selection of deployment to the production server, of selected development code definitions.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of making production data available from a production server for development testing, including:
 providing a development server code, including
  an app server code that, when run on a processor,
   serves a development app that is a modified version of a production app, in response to a request from a developer device, wherein the development app
   includes replication of access to production server application programming interfaces (APIs) used to retrieve and process time series data from a data store, the replication including access to development server API's that mirror relative addressing of production APIs; and
  exposes development APIs that mirror production APIs of the production server and relay selected messages between the development app and the production server; and
 a code manager that, when run on the processor, accesses development code definitions in a persistent development code store, in response to a request from the development app;
 receiving at least one data assembly and rendering request from a development server that includes or references a definition of data assembly and rendering requirements;
 processing each data assembly and rendering request against the data store; and
 returning results of the processing via the development server.

2. The method of claim 1, further including a deployment manager that when run on the processor that accesses development code in the persistent development code store, deploys selected development code to the production server, in response to a request from the development app.

3. The method of claim 1, further including the production server receiving from the development server code, one or more data transformation requests that include a definition of data transformation requirements.

4. The method of claim 1, wherein the development code definitions in the persistent development code store are development code definitions of dashboards and are expressed in JSON or XML.

5. The method of claim 1, wherein the results returned via the development server from the processing include a graphic that illustrates the data assembled in response to the data assembly and rendering request.

6. The method of claim 1, wherein the results returned via the development server from the processing include data values assembled in response to the data assembly and rendering request, adapted for rendering by the development app.

7. A development server, including:
 a processor, memory coupled to the processor, the processor coupled in communication with a persistent development code store that holds development code;
 the processor coupled in communication with a production server;
 an app server running on the processor that
  serves a development app that is a modified version of a production app, in response to a request from a developer device; and
  exposes development application programming interfaces (APIs) that mirror production APIs of the production server, and relay messages between the development APIs and the production APIs;
 a code manager running on the processor that accesses the development code in the persistent development code store, in response to a request from the development app; and
 the development app including:
  a user interface for selection among development code definitions of dashboards; and
  replication of access to production server APIs used to retrieve and process time series data from a data store, the replication including access to development server APIs that mirror relative addressing of production APIs.

8. The development server of claim 7, further including the app server running on the processor establishing a session by authenticating a developer to the production server.

9. The development server of claim 7, further including a deployment manager running on the processor that deploys selected development code to the production server, in response to a request from the development app.

10. The development server of claim 7, further including a user interface for selection of deployment of a development code definition to the production server.

11. The development server of claim 7, wherein the development code definitions of the dashboards are expressed in JSON or XML.

12. A method of making production data available for development testing, including:
at a development server:
receiving an app request from a developer device and serving a development app that is a modified version of a production app, wherein the development app:
processes user selection among development code definitions of dashboards in a persistent development code store; and
replicates access to a production server and production server application programming interfaces (APIs) used to retrieve and process time series data from a data store, the replication including access to development server APIs mirroring relative addressing of production APIs of the production server to implement access to data assembly from a production data store, and relaying messages between the development APIs and the production APIs;
receiving at a development API a preview request from the development app to preview at least one data assembly and rendering request;
forwarding the request and a dashboard code definition to the production server at a production API replicated by the development API that received the preview request; and
receiving from the production server and causing display, at the developer device, of results from the processing.

13. The method of claim 12, wherein the results received from the production server include a graphic that illustrates the data assembled in response to the preview request.

14. The method of claim 12, wherein the results received from the production server include data values assembled in response to the preview request, adapted for rendering at the developer device.

15. The method of claim 12, wherein the developer device includes an app or browser.

16. The method of claim 12, wherein the development API includes a user interface for selection of deployment to the production server of the development code.

17. The method of claim 12, wherein the persistent development code store uses one of JSON or XML to represent development code definitions of dashboards.

18. A development server code, stored in a non-transitory computer readable medium, including instructions executable on a processor that implement:
an app server that
serves a development app that is a modified version of a production app from a production server, in response to a request from a developer device, wherein the development app includes replication of access to production server application programming interfaces (APIs) used to retrieve and process time series data from a data store, the replication including access to development server API's that mirror relative addressing of production APIs,
exposes development APIs that mirror production APIs of the production server that implement access to data assembly from a production data store, and relay selected messages between the development app and the production server; and
returns results from the processing to a developer device;
wherein the production APIs process requests for data assembly and rendering, accompanied by dashboard code definitions; and
a code manager that accesses development code in a persistent development code store, in response to a request from the development app.

19. The development server code of claim 18, stored in the non-transitory computer readable medium, further including a deployment manager that deploys selected development code to the production server, in response to a request from the development app.

20. The development server code of claim 18, stored in the non-transitory computer readable medium, further including a deployment manager including a user interface for selection of deployment to the production server of a selected development code definition.

21. The development server code of claim 18, stored in the non-transitory computer readable medium, wherein the returned results include a graphic that illustrates the data assembled in response to the data assembly and rendering request.

22. The development server code of claim 18, stored in the non-transitory computer readable medium, wherein the results returned via the development server from the processing include data values assembled in response to the data assembly and rendering request, adapted for rendering by the development app.

23. A development app code, stored in a non-transitory computer readable medium, the development app code including instructions executable on a processor that implement:
a development app that is a modified version of a production app from a production server, wherein the development app includes replication of access to production server application programming interfaces (APIs) used to retrieve and process time series data from a data store, the replication including access to development server API's that mirror relative addressing of production APIs, and wherein the development app includes:
reference to development APIs of the development server that mirror the production APIs of the production server that implement access to data assembly from a production data store and relay messages between the development app and the production server;
wherein the production APIs process requests for data assembly and rendering, accompanied by dashboard code definitions, against a production data store;
access to a code manager running on the development server that accesses development code in a persistent development code store, in response to a request from the development app; and access to a deployment manager that deploys selected development code from the persistent development code store to the production server, in response to a request from the development app.

24. The development app code of claim 23, stored in the non-transitory computer readable medium, wherein the deployment manager includes a user interface for selection of deployment to the production server, of selected development code definitions.

* * * * *